United States Patent
Jones et al.

(10) Patent No.: US 9,602,529 B2
(45) Date of Patent: Mar. 21, 2017

(54) THREAT MODELING AND ANALYSIS

(71) Applicant: The Boeing Company, Seal Beach, CA (US)

(72) Inventors: Edmund J. Jones, Bellevue, WA (US); Matthew W. Costello, Titusville, FL (US); Martin Schleiff, Bellevue, WA (US); David S. Miller, Seattle, WA (US); Aradhna Chetal, Mercer Island, WA (US); Marion M. Belden, Issaquah, WA (US); Volha V. Gallup, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 437 days.

(21) Appl. No.: 14/242,897

(22) Filed: Apr. 2, 2014

(65) Prior Publication Data

US 2015/0288712 A1    Oct. 8, 2015

(51) Int. Cl.
*G06F 11/00* (2006.01)
*H04L 29/06* (2006.01)
(Continued)

(52) U.S. Cl.
CPC ........ *H04L 63/1433* (2013.01); *G06F 21/577* (2013.01); *G06F 2221/2101* (2013.01); *H04L 67/12* (2013.01)

(58) Field of Classification Search
CPC .............................. H04L 12/5875; H04M 3/22
(Continued)

(56) References Cited

U.S. PATENT DOCUMENTS 4,924,456 A * 5/1990 Maxwell ............... H04L 1/0002
370/296
5,826,198 A * 10/1998 Bergins ................. H04W 99/00
455/434
(Continued)

OTHER PUBLICATIONS

"Data flow diagram," Copyright 2013, Wikipedia article—http://en.wikipedia.org/wiki/Data_flow_diagram, [Jan. 14, 2014], 3 pages.
(Continued)

*Primary Examiner* — Arvin Eskandarnia
(74) *Attorney, Agent, or Firm* — Womble Carlyle Sandridge & Rice LLP

(57) ABSTRACT

A system is provided for modeling and analysis of cybersecurity threats may include a data flow diagram (DFD) creator, threat indicator and threat analyzer. The DFD creator may identify elements of an information system, and compose a DFD including nodes and edges representing components and data flows of the information system. The threat indicator may identify a cybersecurity threat to a particular element of the information system, and add a secondary node representing the cybersecurity threat to the DFD to thereby produce a threat-model DFD for the information system. In metadata associated with the nodes, edges and secondary node, the DFD creator and threat indicator may provide structured information including attributes of the components, data flows and cybersecurity threat. And the threat analyzer may perform an analysis of the cybersecurity threat based on the threat-model DFD and metadata associated with the nodes, edges and secondary node thereof.

21 Claims, 11 Drawing Sheets

(51) Int. Cl.
*G06F 21/57* (2013.01)
*H04L 29/08* (2006.01)

(58) Field of Classification Search
USPC .......................................................... 726/25
See application file for complete search history.

(56) References Cited

U.S. PATENT DOCUMENTS

| | | | | |
|---|---|---|---|---|
| 5,935,267 | A * | 8/1999 | Hayakawa | H04L 12/40071 370/216 |
| 7,907,545 | B2 * | 3/2011 | Ric | B64D 11/0015 244/118.5 |
| 8,401,729 | B2 * | 3/2013 | Rouyre | B64F 5/0045 701/1 |
| 2003/0186706 | A1 * | 10/2003 | Bergins | H04W 99/00 455/452.2 |
| 2004/0198498 | A1 * | 10/2004 | Yamashita | A63F 13/005 463/43 |
| 2006/0179457 | A1 * | 8/2006 | Brady | A63F 13/12 725/76 |
| 2013/0198847 | A1 | 8/2013 | Sampigethaya | |
| 2013/0203023 | A1 * | 8/2013 | Sadeh-Koniecpol | G09B 5/00 434/118 |
| 2014/0013431 | A1 | 1/2014 | Bush et al. | |
| 2015/0339409 | A1 * | 11/2015 | Nakhjavani | G06F 17/50 703/1 |

OTHER PUBLICATIONS

Lebanidze, "Guide to Developing a Cyber Security and Risk Mitigation Plan," Copyright 2011, National Rural Electric Cooperative Association / Cooperative Research Network, Smart Grid Demonstration Project, 125 pages.

Microsoft, "SDL Threat Modeling Tool," Copyright 2014, Security Development Lifecycle, website article—http://www.microsoft.com/security/sdl/adopt/threatmodeling.aspx, [Jan. 14, 2014], 2 pages.

Microsoft, "Security," Copyright 2013, Security Developer Center: Application Threat Modeling, website article—http://msdn.microsoft.com/en-us/security/aa570413.aspx, [Jan. 14, 2014], 1 page.

Microsoft, "The STRIDE Threat Model," Copyright 2005, 2014, website article—http://msdn.microsoft.com/en-us/library/ee823878, [Jan. 14, 2014], 1 page.

OWASP (Open Web Application Security Project), "Threat Risk Modeling," 2010, website article—https://www.owasp.org/index.php/Threat_Risk_Modeling, [Jan. 14, 2014], 12 pages.

* cited by examiner

| REF # | VULNERABILITY | THREAT | IMPACT | CURRENT CONTROLS | LIKELIHOOD | CURRENT RISK |
|---|---|---|---|---|---|---|
| 1 | Client-server connections unencrypted | Attacker may capture usernames and passwords. | Critical | | Very High | Critical |
| 2 | RPC network connections not integrity-protected. | Attacker may change data using a man-in-the-middle attack. | Critical | Transmission occurs on a protected network segment available only to sys admins. | Medium | High |
| 3 | Buffer overflow finding in AppScan | Attacker may impersonate a system administrator. | Critical | | Medium | High |
| 4 | Password authentication | System administrator may be impersonated. | High | Complex password policy | Medium | Medium |
| 5 | No failover system. | Failure of primary system will result in unavailability of functionality. | Medium | | Medium | Medium |
| 6 | No vetting process for administrators | Improper access to system | High | Manager Approval | Low | Low |
| 7 | Admin actions not logged. | Rogue admin may subvert system with no forensic detection possible. | Low | | Low | Low |
| 8 | Host-based firewall off | Increased attack surface of system. | Medium | Network-based firewall protects system. | Low | Low |

● YELLOW  ◎ PURPLE  ⦿ RED  ◉ GREEN

FIG. 10A

| Numbering for this table - this does not correspond to numbering in the Visio diagram. | Security controls that are recommended to bring the Current Risk rating lower. | Risk given that suggested mitigations are implemented. | The data flow diagram (DFD) element(s) that the threat applies to. | Additional clarifying information. If a finding is preliminary, meaning it needs further research indicate "Preliminary" here. | Use to note whether the review process has resulted in acceptance of this threat and associated impact and risk ratings. |
|---|---|---|---|---|---|
| REF # | SUGGESTED MITIGATIONS | RESIDUAL RISK | APPLIES TO | REMARKS | REVIEW STATUS |
| 1 | Encrypt client-server connections | Medium | Data flows between client app and server. | | Reviewed |
| 2 | Protect RPC connections with a protocol that provides integrity-protection (like SSL/TLS) | Medium | Master-to-Backup data flow | This is an information disclosure threat that may lead to a follow-on threat of spoofing threat. | Likelihood rating not agreed |
| 3 | Fix buffer overflow. | Medium | Login process | | Not Reviewed |
| 4 | Use strong two-factor authentication. | Low | Database system | CVSS rating of threat indicated high difficulty to reproduce, which is why likelihood is rated Medium | Waiting to clear Preliminary status |
| 5 | Implement a failover server in the same datacenter as primary server. Implement regional failover server. | Medium | Web server Application server | Preliminary: <Describe why finding is preliminary> Preliminary: <Describe why finding is preliminary> Regional failover needed to bring residual risk to Low. | Waiting to clear Preliminary status |
| 6 | Background check | Low | Top level sys admins | Not a traditional STRIDE threat. Improper admin designation could result in all STRIDE threats. | Reviewed |
| 7 | Log admin success and fail actions. | Low | Application Server | | Reviewed |
| 8 | Turn on host-based FW | Low | Web server | Type is "Undetermined" as the vulnerability is very general. | Not Reviewed |

● YELLOW ◎ GREEN

FIG. 10B

THREAT MODELING AND ANALYSIS

TECHNOLOGICAL FIELD

The present disclosure relates generally to cybersecurity and, in particular, to modeling and analysis of cybersecurity threats in complex-system (e.g., aviation) platforms.

BACKGROUND

At least some known complex-system platforms and infrastructures have adopted IT-enabled (or e-enabled) architectures and technologies to implement information systems and thereby take advantage of operational and performance efficiencies that result from being networked. These types of architectures and technologies implement information systems across a wide variety of industries, from those that support business operations to those that support complex modes of transportation. Aviation platforms and infrastructures, for example, are complex system platforms that involve hierarchically-networked embedded systems with varying operational criticality, reliability and availability requirements, and include systems both onboard and off-board aircraft. As these systems, and thus the aircraft, have become IT-enabled, they may be the targets of cybersecurity threats.

Generally, within at least some known platforms, the embedded systems are hosted on general-purpose computing devices, commercial software operating systems and specific custom applications performing intended system functions. Onboard embedded systems may be networked via standards-based protocols to enable seamless integration of the IT-enabled architecture to implement various information systems. And just like the systems, their integration may also be the target of cybersecurity threats.

A number of techniques have been developed for threat modeling and others for threat analysis, but these techniques are typically independent of one another, focus on individual systems, and fall short in the case of large-scale integrations for complex systems such as aircraft. It may therefore be desirable to have a system and method that addresses these challenges, and improves upon existing practices.

BRIEF SUMMARY

The hierarchical nature of the embedded systems of aircraft and other complex systems implies that cybersecurity threats cannot be viewed individually as they apply to a single system of a complex-system platform, but rather such threats must generally be viewed across a complex-system platform or information systems implemented by the complex-system platform. Example implementations of the present disclosure may facilitate an understanding of these information systems, and cybersecurity threats to which they may be susceptible. This understanding may facilitate the design or modification of an information system to mitigate or further mitigate the risk of those threats, to an acceptable if not desired level.

According to one aspect of example implementations, an apparatus is provided for implementation of a system for modeling and analysis of cybersecurity threats in a complex-system platform. The apparatus includes a processor and a memory storing executable instructions that in response to execution by the processor cause the apparatus to implement components of the system, including a data flow diagram (DFD) creator, threat indicator and threat analyzer that may be coupled to one another.

The DFD creator may be configured to identify elements of an information system configured for implementation by a complex-system platform, and compose a DFD for the information system from those elements. The elements of the information system may include components such as hosts, processes, data stores and/or external entities, and data flows between components. The DFD, then, may include nodes representing the components and edges representing the data flows.

The DFD creator may also provide structured information including attributes of the components and data flows, and may do so in metadata according to some metadata schema and associated with the nodes and edges of the DFD. In some examples, this structured information may include hardware, software and communications attributes of at least some of the components and data flows. And in some examples, the structured information may include any authentication, authorization or security controls to which the components and data flows are subject.

The threat indicator may be configured to identify a cybersecurity threat to a particular element of the information system, and add a secondary node representing the cybersecurity threat to the DFD to thereby produce a threat-model DFD for the information system. Similar to the DFD creator, the threat indicator may provide structured information including attributes of the cybersecurity threat, and may do so in metadata associated with the secondary node of the threat-model DFD. This structured information may include, for example, a description of the cybersecurity threat and a vulnerability giving rise thereto, a description of any current security controls designed to mitigate the cybersecurity threat or the like.

The threat analyzer may be configured to perform an analysis of the cybersecurity threat based on the threat-model DFD and metadata associated with the nodes, edges and secondary node thereof. In some examples, this may include the threat analyzer being configured to identify a measure of current risk of the cybersecurity threat to a particular element, and identify a suggested mitigation implementable to reduce the measure of current risk to a lower, measure of residual risk.

The threat analyzer may also provide in the metadata associated with the secondary node, further structured information including the measure of current risk, suggested mitigation and measure of residual risk. A cybersecurity threat may refer to a circumstance or event with a likelihood to have an adverse impact on the information system or a particular element of the information system. In some examples, then, the measure of current risk may be a function of measures of the likelihood and adverse impact. And the further structured information provided in the metadata associated with the secondary node may also include the measures of likelihood and impact.

In some examples, the threat analyzer may perform the analysis to thereby produce a threat analysis. In these examples, the memory of the apparatus may store further executable instructions that in response to execution by the processor cause the apparatus to further implement a reporter. In this regard, the reporter may be configured to generate a report from the threat analysis, and including an organized arrangement of at least some of the attributes of at least some of the components, data flows or cybersecurity threat.

In other aspects of example implementations, a method and computer-readable storage medium are provided for modeling and analysis of cybersecurity threats in a complex-system platform. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

Figure 6:
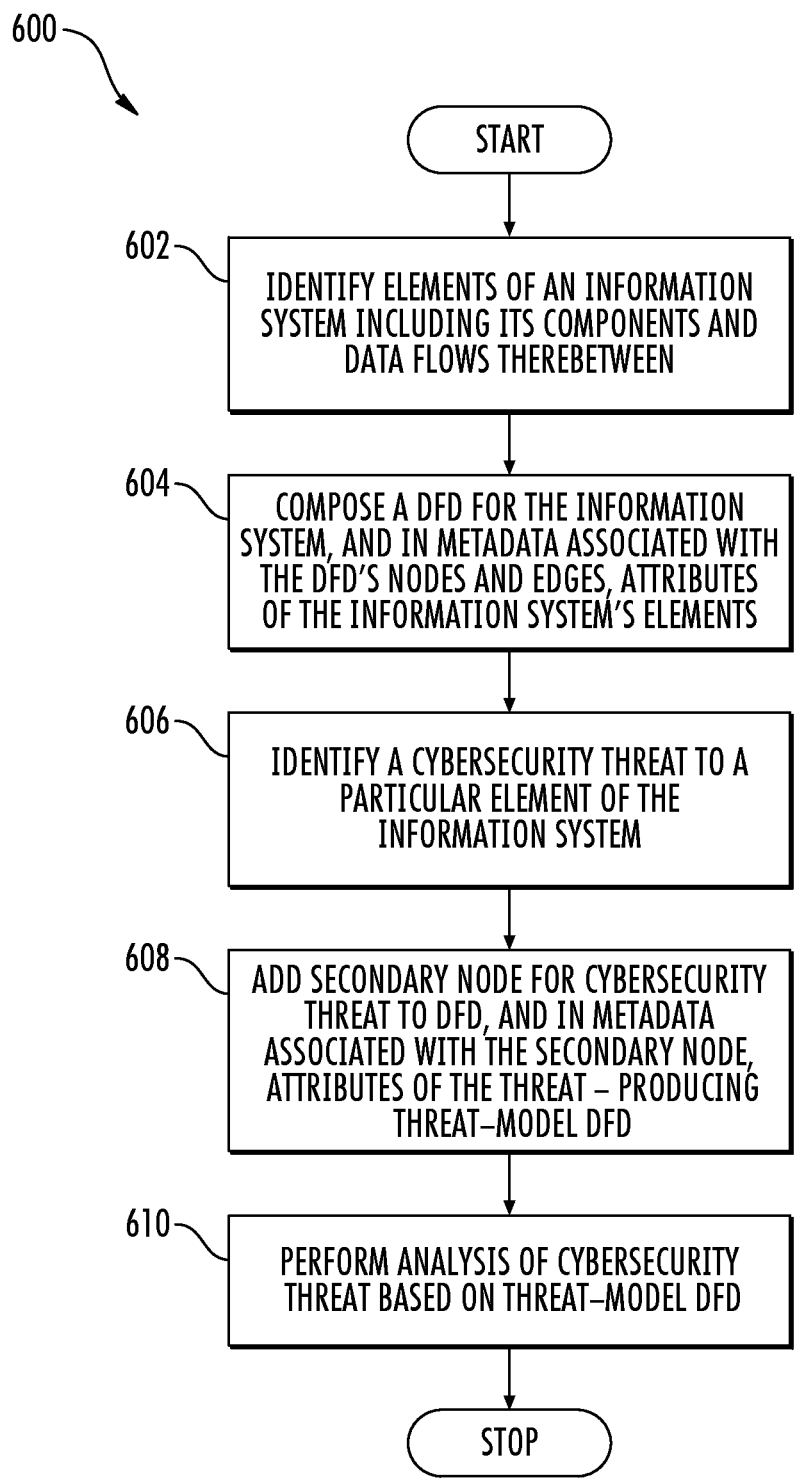
Figure 7:
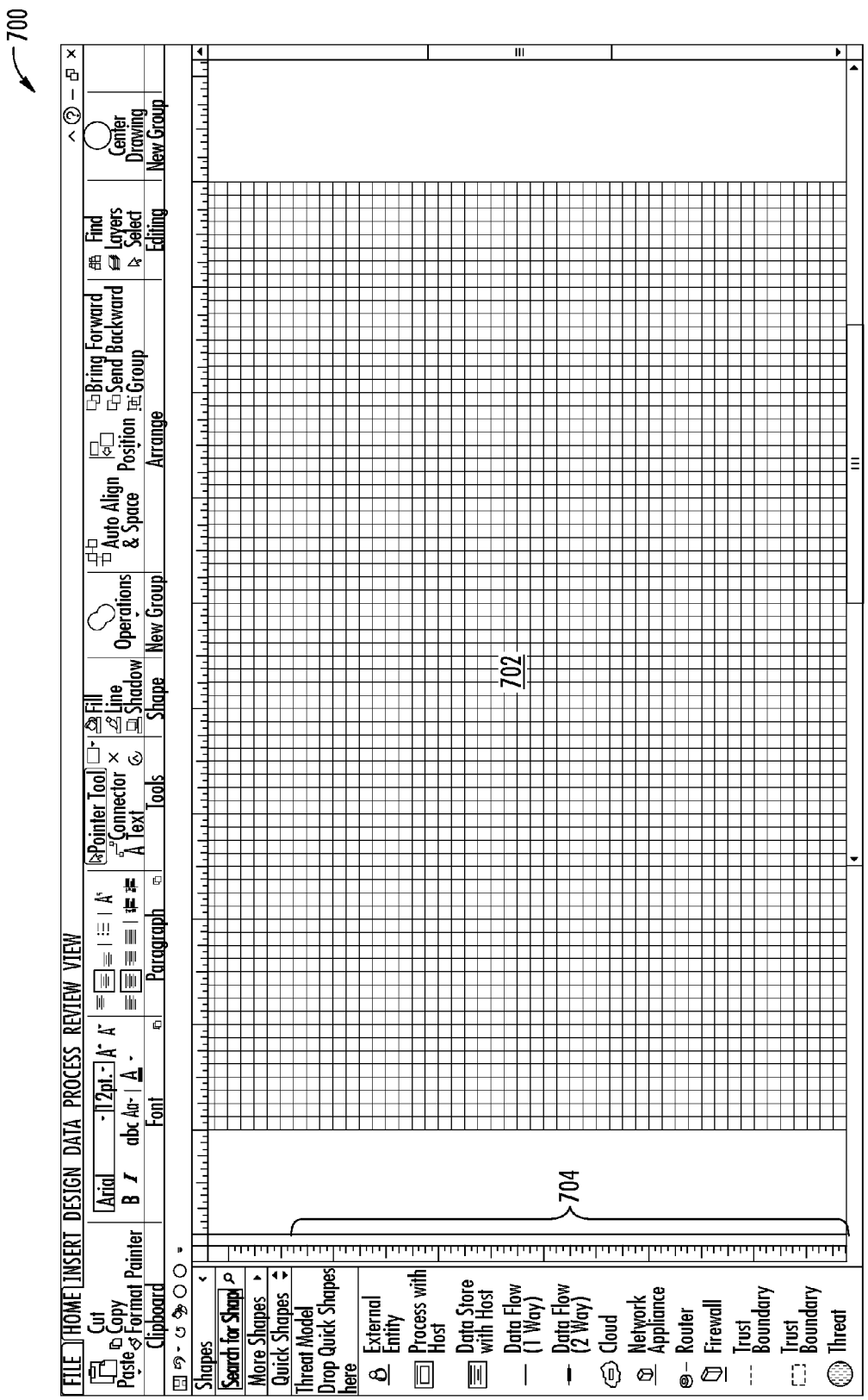
Figure 8:
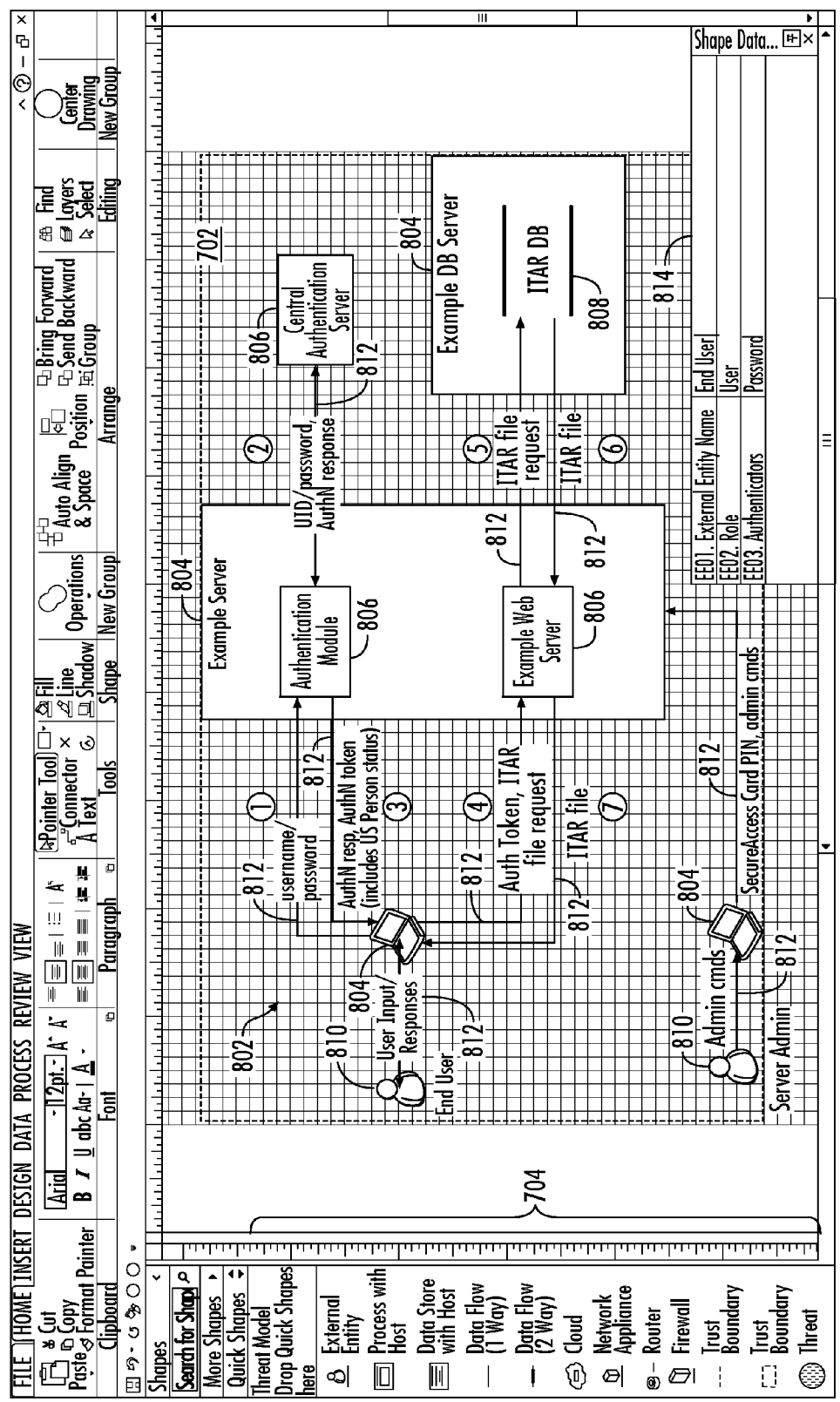
Figure 9:
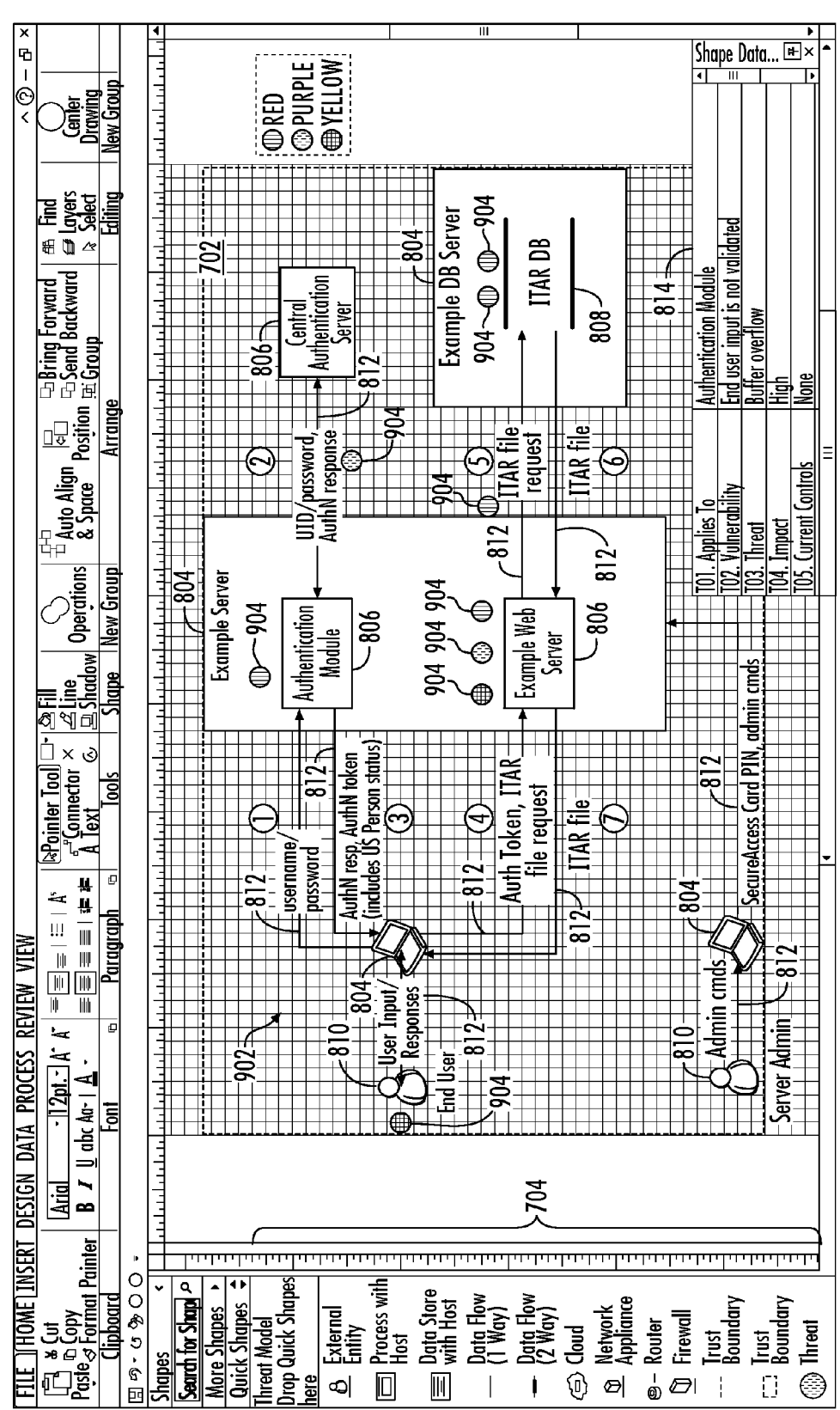

FIG. 6 illustrates a flowchart including various operations in a method of modeling and analysis of cybersecurity threats in a complex-system platform, according to example implementations of the present disclosure; and FIGS. 7-9 depict an example graphical user interface in which a DFD, threat-model DFD and their metadata may be composed or produced according to some example implementations of the present disclosure; and FIGS. 10A and 10B depict an example report that may be generated according to example implementations.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to modeling and analysis of cybersecurity threats in a complex-system platform such as that of an aircraft. A complex-system (e.g., aviation) platform may refer to a hardware architecture including one or more systems of a complex-system, and software framework including one or more application frameworks, that enable software such as particularly application software to operate the complex system or one or more of its systems. In accordance with example implementations, the complex-system platform may be configured to implement one or more information systems, at least some of which may be susceptible to one or more cybersecurity threats. A cybersecurity threat may refer to a circumstance or event with a likelihood to have an adverse impact on an asset, such as the information system or elements of the information, or in some examples, the complex-system platform or one or more of its components (e.g., systems) configured to implement the information system, through unauthorized access, destruction, disclosure, modification of data and/or denial of service.

Figure 1:
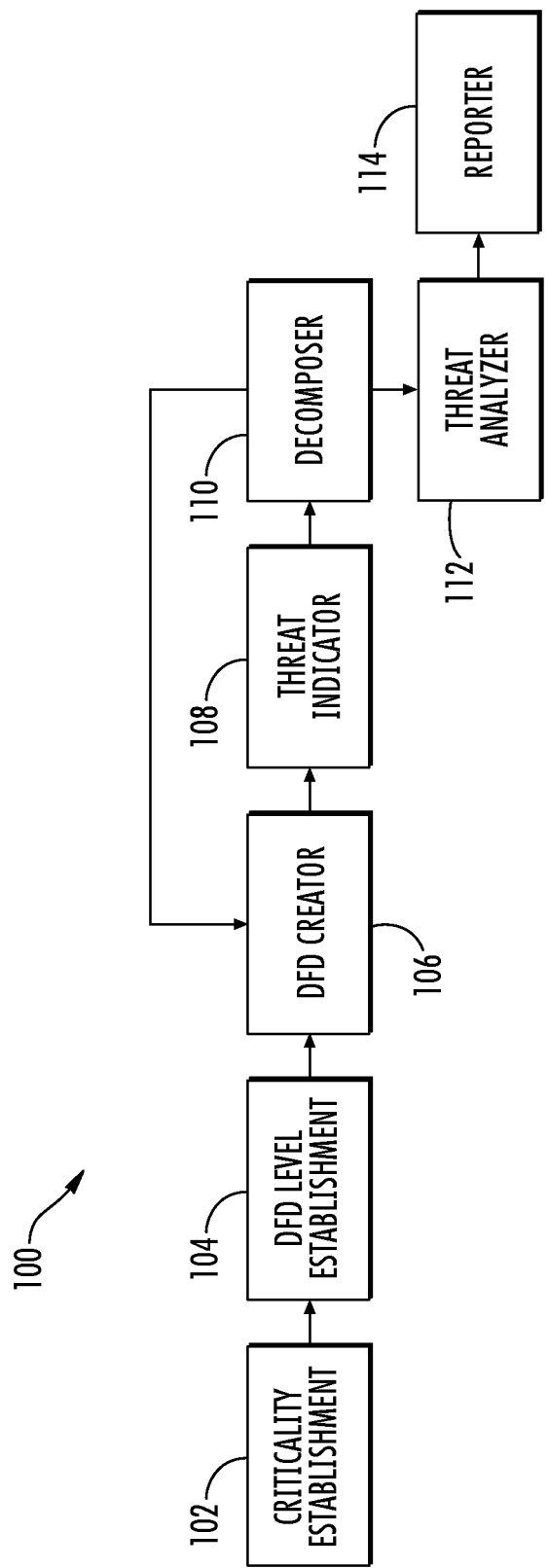
FIG. 1 is an illustration of a system for modeling and analysis of cybersecurity threats in a complex-system platform, in accordance with example implementations of the present disclosure.

Referring now to FIG. 1, a modeling and analysis system 100 for modeling and analysis of cybersecurity threats in a complex-system platform is illustrated according to example implementations of the present disclosure. The system may be configured to perform a number of different functions or operations, either automatically, under direct operator control, or some combination of thereof. In this regard, the system may be configured to perform one or more of its functions or operations automatically, that is, without being directly controlled by an operator such as a security architect that may be assigned to model and analyze cybersecurity threats in the complex-system platform. Additionally or alternatively, the system may be configured to perform one or more of its functions or operations under direct operator control.

The system 100 may include one or more of each of a number of different subsystems (each an individual system) coupled to one another for performing one or more functions or operations. As shown in FIG. 1, for example, the system may include a criticality establishment system 102, data flow diagram (DFD) level establishment system 104, DFD creator 106, threat indicator 108, decomposer 110, threat analyzer 112 and/or reporter 114. Although shown as part of the modeling and analysis system, one or more of the criticality establishment system, DFD level establishment system, DFD creator, threat indicator, decomposer, threat analyzer and/or reporter may instead be separate from but in communication with the modeling and analysis system. It should also be understood that one or more of the subsystems may function or operate as a separate system without regard to others of the subsystems. And further, it should be understood that the modeling and analysis system may include one or more additional or alternative subsystems than those shown in FIG. 1.

The criticality establishment system 102 may be generally configured to provide a desired level of assurance for an information system configured for implementation by a complex-system platform. The desired level of assurance may depend on a number of different factors including, for example, technologies of the complex-system platform used to implement the information system, use cases of the information system (e.g., starting from an end user), any data classification and/or regulatory compliance requirements, a risk sorter or the like. A risk sorter in some examples may solicit information from an operator (e.g., security architect) through a series of questions and answers regarding the impact to the complex system if various vulnerabilities are exposed. From this information, the risk sorter may generate a security index rating, and in some examples, an individual rating for one or more security principles such as confidentiality (only those authorized may access data), integrity (the data is unaltered) and/or availability (the information system or applicable element thereof is available when needed).

In some examples, the criticality establishment system 102 may be configured to collect information regarding factors on which the desired level of assurance may depend, from which an operator may select the desired level of assurance for the information system. In at least some of these examples, the operator may provide the selected desired level of assurance to the criticality establishment system, which may then in turn provide the desired level of assurance.

The information system may include components such as hosts, processes, data stores and/or external entities, and data flows between those components. In some examples, a process may be identified along with the host on which the process is configured to run; and similarly, in some examples, a data store may be identified along with the host on which the data store is configured to run. In some examples, the information system may be describable in terms of a hierarchical breakdown (hereinafter referred to as a "hierarchy") of its components (interconnected by appropriate data flows) at different levels. In this regard, one or more of the information system's components—more often a process, host or data store—may include multiple nested components, one or more of which may include further additional nested components at lower levels of the hierarchy.

The DFD level establishment system 104 may be configured to assess various criteria of the information system to identify an appropriate level of threat model—threat-model data flow diagram (DFD)—to produce for the information system. In some examples, various criteria of the information system may be associated with various levels, and the appropriate level may identified by matching criteria to a level. For example, the DFD level establishment system may identify a level 2 threat model as appropriate in instances in which the threat model is for any of the following: higher trust level network enclave environments, hybrid access zone, high-trust access zone, Internet facing applications and/or systems with transitive access, perimeter-related systems. In instances in which the threat model is not for any of the aforementioned, a level 2 threat model may still be appropriate in instances in which it is based on data classification that application or system stores and/or processes for any of the following: sensitive or highly-sensitive personally identifiable information (PII), own or third-party proprietary, critical technical information (CTI), export-controlled EAR, ITAR, material non-public or national security information, trade secret or the like. And in instances in which none of the foregoing are met, the DFD level establishment system may identify a level 1 threat model as appropriate.

The DFD creator 106 may be configured to identify elements of the information system, and compose a DFD for the information system from those elements and in accordance with the threat-model level identified by the DFD level establishment system 104. The DFD may include nodes representing the components and edges representing the data flows. The DFD represent the information system at some level n of the hierarchy, and may at times be referred to as a level n DFD (e.g., level 2 DFD).

The DFD creator 106 may also provide structured information including attributes of the components and data flows, and may do so in metadata according to some metadata schema and associated with the nodes and edges of the DFD. In some examples, this structured information may include hardware, software and communications attributes of at least some of the components and data flows. And in some examples, the structured information may include any authentication, authorization or security controls to which the components and data flows are subject.

The threat indicator 108 may be configured to identify a cybersecurity threat to a particular element of the elements of the information system, and add a secondary node representing the cybersecurity threat to the DFD to thereby produce a threat-model DFD for the information system—this threat-model DFD at times referred to as a level n threat-model DFD (e.g., level 2 threat-model DFD). Similar to the DFD creator, the threat indicator may provide structured information including attributes of the cybersecurity threat, and may do so in metadata associated with the secondary node of the threat-model DFD. This structured information may include, for example, a description of the cybersecurity threat and a vulnerability giving rise thereto, a description of any current security controls designed to mitigate the cybersecurity threat or the like.

In some examples it may be desirable to look deeper into one or more components of the information system, such as to provide a more thorough analysis of those components or their cybersecurity threats. In these examples, the decomposer 110 may be configured to decompose one or more components of the information system modeled by the DFD into its nested components and data flows therebetween. The decomposer may then provide feedback of its decomposition to the DFD creator 106, which may modify the threat-model DFD for the decomposed components to include their nested components and data flows (and appropriate metadata), thereby producing a level n+1 threat-model DFD. And again, the threat indicator 108 may be applied to identify any cybersecurity threats to elements (nested components and data flows) of the decomposed components, and add appropriate secondary nodes (and appropriate metadata) representing those threats. Or instead of modifying the existing threat-model DFD, in some examples, the DFD creator and threat indicator may begin again to compose a new DFD and threat-model DFD for this level of the hierarchy. This decomposition and follow-on modeling of the information system's components and threats may continue until a desired level of the information system is achieved.

The threat analyzer 112 may be configured to perform an analysis of the cybersecurity threat based on the threat-model DFD and metadata associated with the nodes, edges and secondary node thereof. In some examples, this may include the threat analyzer being configured to identify a measure of current risk of the cybersecurity threat to a particular element, sometimes be referred to as a current-risk rating, and identify a suggested mitigation implementable to reduce the current-risk rating to a lower, measure of residual risk, which may sometimes be referred to as a residual-risk rating.

The threat analyzer 112 may also provide in the metadata associated with the secondary node, further structured information including the current-risk rating, suggested mitigation and residual-risk rating. As explained above, a cybersecurity threat may refer to a circumstance or event with a likelihood to have an adverse impact on the information system or a particular element of the information system. In some examples, then, the current-risk rating may be a function of measures of the likelihood and adverse impact, which may sometimes be referred to as likelihood and impact ratings. And the further structured information provided in the metadata associated with the secondary node may also include the likelihood and impact ratings.

The reporter 114 may be configured to generate one or more reports from the threat analysis, at least one of which may include an organized arrangement of at least some of the attributes of at least some of the components, data flows or cybersecurity threat.

The system 100 of example implementations may be implemented at any of a number of different stages of production of a complex system, from design through manufacturing. The system may facilitate an understanding of information systems implemented by the complex-system platform, and cybersecurity threats to which the information systems may be susceptible. This understanding may facilitate the design or modification of an information system to include security controls or add mitigations (also additional security controls in some examples) to mitigate or further mitigate the risk of those threats, to an acceptable if not desired level. These security controls and mitigations may be included or added in any of a number of different manners, such as to the information system or complex-system platform (hardware architecture/software framework) configured to implement the information system.

FIGS. 2, 3, 4 and 5 illustrate examples of a suitable DFD creator 106, threat indicator 108, threat analyzer 112 and reporter 114, respectively, according to example implementations of the present disclosure.

Figure 2:
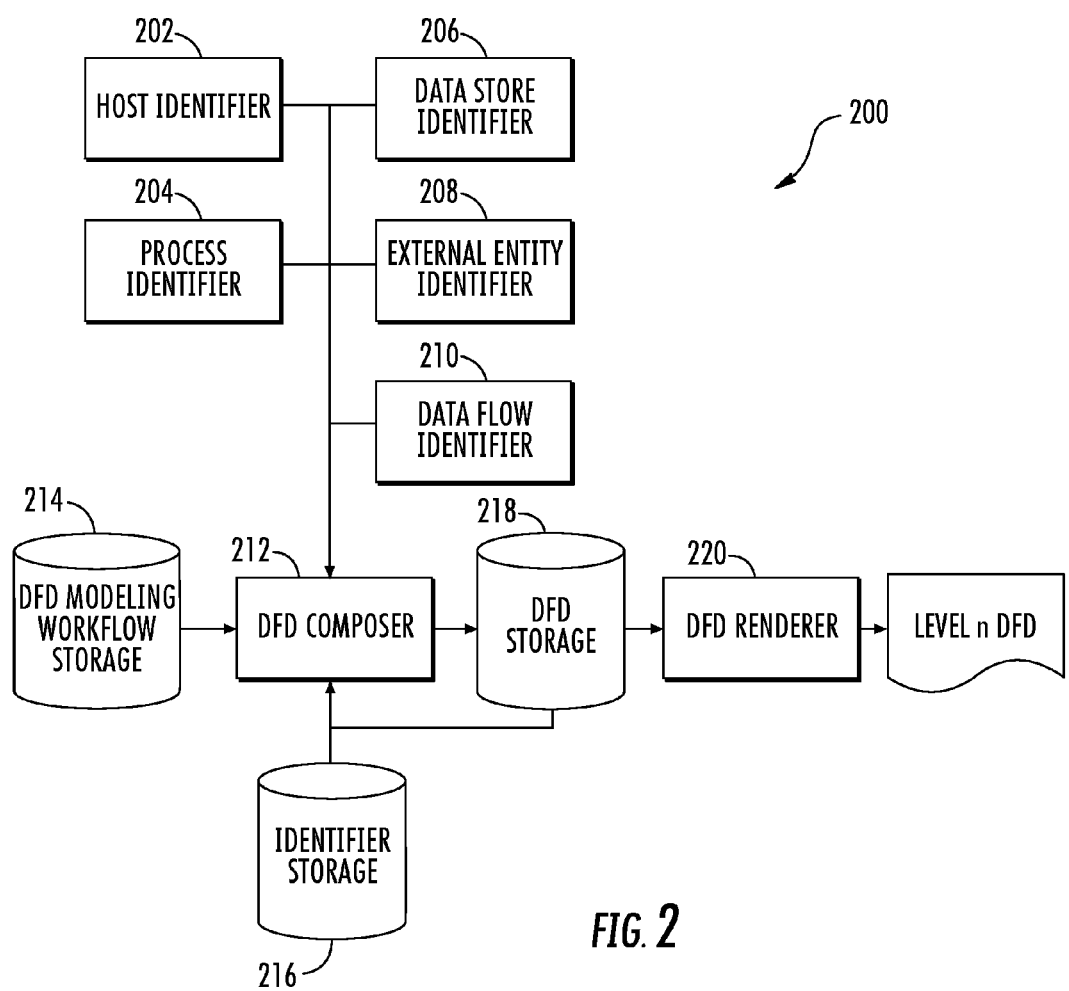
FIGS. 2, 3, 4 and 5 illustrate examples of a suitable data flow diagram (DFD) creator, threat indicator, threat analyzer and reporter, respectively, according to example implementations of the present disclosure.

FIG. 2 illustrates a DFD creator 200, which in some example implementations of the present disclosure may correspond to the DFD creator 106 of FIG. 1. As indicated above and explained in greater detail below, the DFD creator may be more generally configured to identify elements of the information system, and compose a DFD for the information system from those elements. As shown, the DFD creator may include an identifier for each of a number of different types of elements of an information system, including those for components such as hosts 202, processes 204, data stores 206 and/or external entities 208, and data flows 210 between those components. These identifiers may be configured to identify the components and data flows of the information system, as well as their attributes.

The identifiers 202-210 may be coupled to a DFD composer 212 configured to communicate with the identifiers to receive the identification of or identify components and data flows and their attributes, compose a level n DFD representing components and data flows and including metadata with structured information including attributes of the components and data flows.

In addition to the aforementioned examples of components and data flows of an information system from which the DFD may be composed, the DFD may also include trust boundaries between and/or around components. Even further, the DFD may include other relevant components of the complex-system platform configured to implement the information system, such as various network components configured to carry, route, pass, transmit or receive data of the information system. Examples of suitable network components include a network appliance, firewall, router, cloud computing component and the like.

In some examples, the components and data flows of an information system may be identified through the collection of information from an operator (e.g., security architect), or through retrieval of previously collected information from an operator. This information may be collected or retrieved by the DFD composer 212, and with logic provided by the identifiers 202-210, the components and data flows of the information system may be identified.

In examples involving the collection of information, the DFD composer 212 may be coupled to a DFD modeling workflow storage 214 resident with or separate from but in communication with the DFD creator 200. The DFD modeling workflow storage may be configured to store a series of questions and instructions regarding their manner of presentation, which may be loaded by the DFD composer and presented to the operator. The DFD composer may then solicit information from the operator through these questions and their answers regarding the information system, its components and data flows. Similarly, previously collected information regarding an information system, its components and/or data flows may be stored in an identifier storage 216 resident with or separate from but in communication with the DFD creator. As described herein, information and other data may be formatted and stored in any of a number of different manners, and hence, their storage may be of any of a number of different types. Examples of suitable types of storage as described herein include file storage, database storage, cloud storage or the like.

The DFD composer 212 may be configured to communicate the DFD (including the metadata attributes), such as to a DFD storage 218 for later retrieval. The DFD storage may be resident with the DFD creator 200, or may be separate from and in communication with the DFD creator. The DFD and its metadata may be formatted and stored in any of a number of different manners, and hence, their storage may be of any of a number of different types (e.g., file storage, database storage, cloud storage). In some examples, a previously-stored DFD may be retrieved from the DFD storage by the DFD composer to compose a new DFD.

In some examples, the DFD composer 212 may compose the metadata attributes of the components and data flows of the information system without itself composing the DFD. In these examples, the DFD composer may communicate to the DFD storage, the metadata attributes of the information system for a level n DFD. In these examples, the stored metadata attributes may be accessed by a separate DFD renderer 220 configured to compose the level n DFD from the metadata attributes.

As explained above, a DFD may include nodes and edges representing hosts, processes, data stores and/or external entities, and data flows of the information system, as well as metadata with structured information including attributes of those elements. A host identified by the DFD composer 212 in communication with the host identifier 202 may include, for example, a general or specific-purpose computing device on which a process may be configured to run. Similarly, for example, a host may include a general or specific-purpose computing device on which a data store is configured to run. Examples of suitable attributes of a host include one or more of the following:

| Example Host Attributes | |
|---|---|
| Attribute | Description |
| Host Name | A fully qualified name of the host. |
| Operating System | An operating system (OS) that the host is running. |
| OS Version | The version of the OS that the host is running. |
| Virtual | Indicates whether or not the host is virtual, and if so, what virtualization software controls it. |
| Location of Host | Physical location of host (data center location, building number, etc.), or if the host is virtual, the location of the host OS. |
| OS Patching Plan | Indicates any plan for how the host operating system is patched (e.g., on a periodic basis. |
| OS Hardening Plan | Indicates any plan according to which is the host OS may be hardened, so as to limit unneeded ports, protocols, services or the like. |
| User Authentication | Indicates how a user (non-administrator) is authenticated. |
| Admin Authentication | Indicates how an administrator is authenticated. |
| Password Policy | Indicates a policy for password authentication in instances in which either users or administrator authenticate by password. The policy may include parameters such as complexity, history, minimum and/or maximum ages. |

Example Host Attributes (continued)

| Attribute | Description |
| --- | --- |
| Local Administrator Password Management | Indicates who is in control of managing passwords in instances in which administrator authenticate by password to ensure they are periodically changed, and that any other password policy is enforced. |
| Host Redundancy | Indicates how any host availability requirements are met. |
| Remote Access Allowed | Indicates whether or not remote access is allowed, and if so, how is remote access allowed. |
| File Transfer Allowed | Indicates whether or not remote file transfer is allowed, either to or from the host. |

A process identified by the DFD composer 212 in communication with the process identifier 204 may include, for example, computer program code instructions, program instructions or executable computer-readable program code instructions (at times generally referred to as "computer programs," e.g., software, firmware, etc.) that may be run or otherwise executed by a host. Examples of suitable attributes of a process include one or more of the following:

Process Attributes

| Attribute | Description |
| --- | --- |
| Process Name | A descriptive name of the process. |
| Process Type | The type of process (e.g., Web service or application, Windows ® service or client, Unix ®/Linux ® service or client). |
| Runs As | An account under which the process runs. |
| Process Hardened (if COTS/OSS) | Indicates whether the process is hardened in instances in which the process is commercial-off-the-shelf (COTS) or open source software (OSS). Examples of processes that may be hardened include active directory, web servers or the like. |
| COTS or Open Source | Indicates whether the process uses COTS or SS software, and if so, provides detail. |
| Code Scanning | Indicates whether a code scan may be required, and may also indicate a type of code scan. |
| Language | Indicates the development or scripting language for custom-written code. |
| Authentication | Indicates how the process authenticates external parties making connections to it (i.e., how others authenticate to the process). |
| Authorization | Indicates how the process provides varying levels of access to different users (if it does at all). |
| Password Policy | Indicates a policy for password authentication in instances in which authentication is by password. The policy may include parameters such as complexity, history, minimum and/or maximum ages. |
| Log Content | Indicates what (if any) user actions the process logs, and what (if any) data is included in the log. This may take consideration of security actions (e.g., login, change role, reset password), and/or business domain actions (e.g., sent document, notified manager, added access). |
| Log Facility | Indicates what (if any) logging system is in use for the process. This may include, for example, a local OS logging facility (e.g., Windows ® event logs or Unix ® syslog), or an external logging facility (e.g., RSA Envision). |
| Audit Policy | Indicates how auditing of process logs is done, and may include frequency of log inspection, use of external log monitoring facilities and the like. |
| Code Protected via | Indicates what protects the integrity of the process code as installed on its host. |
| Credentials used for External Service | Indicates whether or not the process authenticates to another process, and if so, how the credentials are used for that authentication protected as they are stored on the host. An example may be a database connection string password used in establishing a connection to a database, and how (if at all) the password is protected as it is stored. |
| Using Dynamic Query | Indicates whether or not the process queries a database using a query string which is formed from external user input. |
| Input Validation | Indicates whether or not input from external entities or processes is validated, and if so, how. |
| Redundancy | Indicates how availability requirements for the process are met, and whether or not redundant processes are run in case the process fails. |
| Out-of-scope | Indicates whether or not the process is out-of-scope for threat analysis. An out-of-scope process may be one to/from which data flows with other components of the information system, but that itself is not part of the information system or threat model. |

A data store identified by the DFD composer 212 in communication with the data store identifier 206 may include, for example, a database such as a relational database (Oracle or SQL Server database, MySQL database), a directory (e.g., active directory, lightweight directory access protocol—LDAP—directory), flat file or the like, that may be run or otherwise maintained or accessed by a host. Examples of suitable attributes of a data store include one or more of the following:

Data Store Attributes

| Attribute | Description |
| --- | --- |
| Data Store Name | A descriptive name of the data store. |
| Data Store Type | The type of data store (e.g., SQL Server database, MySQL database, active directory, LDAP, flat file). |
| Data Store Version | The version of the data store in use, or version of the OS in instances in which the data store is embedded therein (e.g., active directory). |
| Runs As | Account under which the data store runs. |
| Authentication | Indicates how the data store authenticates external parties making connections to it (i.e., how others authenticate to the data store). |
| Authorization | Indicates how the data store provides varying levels of access to different users (if it does at all). |
| Password Policy | Indicates a policy for password authentication in instances in which authentication is by password. The policy may include parameters such as complexity, history, minimum and/or maximum ages. |
| Permissions | Indicates the level of permissions that may be provided to users when connecting to the data store (e.g., create, read, update, delete). |
| Log Content | Indicates what (if any) user actions the data store logs, and what (if any) data is included in the log. |
| Log Facility | Indicates what (if any) logging system is in use for the data store. This may include, for example, a local OS logging facility (e.g., Windows ® event logs or Unix ® syslog), or an external logging facility (e.g., RSA Envision). |
| Audit Policy | Indicates how auditing of data-store logs is done, and may include frequency of log inspection, use of external log monitoring facilities and the like. |
| Use of Stored Procedures or Parameterized Queries | For databases, indicates whether the data store is queried by stored procedures and/or parameterized queries? |

-continued

Data Store Attributes

| Attribute | Description |
| --- | --- |
| Redundancy | Indicates how availability requirements for the data store are met, and whether or not redundant processes are run in case the data store fails. |
| Credentials, PII, or other sensitive data encrypted? | Indicates whether or not sensitive information stored in the data store is encrypted. This information may include, for example, security credentials, PII or other sensitive data. |

An external entity identified by the DFD composer 212 in communication with the external entity identifier 208 may include a user with some role (e.g., user, administrator, operator) that interacts with another component of the information system (e.g., host, process, data store). Examples of suitable attributes of an external entity include one or more of the following:

External Entity Attributes

| Attribute | Description |
| --- | --- |
| External Entity Name | A name of the external entity. |
| Role | The role of the entity in the information system. |
| Authenticators | Indicates what the external entity uses to authenticate to another component of the information system, with some authenticators possibly implying two-factor authentication. |

A data flow identified by the DFD composer 212 in communication with the data flow identifier 210 may include any data that flows between components of the information system (e.g., host, process, data store). One example of a suitable data flow may be between an external entity and process that represents a user authenticating to a website. Examples of suitable attributes of a data flow include one or more of the following:

Data Flow Attributes

| Attribute | Description |
| --- | --- |
| Connection Name | A name of the data flow. |
| Data Flowing on this Connection | The type of data flowing in the data flow, such as business or security data. Examples include username, password, group memberships, design documents and the like. |
| Proprietary Data Control Type | Indicates the sensitivity of the data on some scale, such as in increasing sensitivity: basic, enhanced or enhanced with special controls. |
| Connection Type | The protocol over which the data flows. |
| Security Controls | Indicates security controls (mechanisms) that are implemented for the data flow, and protect data on the flow. In some examples, this may be closely related to connection type (e.g., HTTPS has security controls encryption and integrity). |

Figure 3:
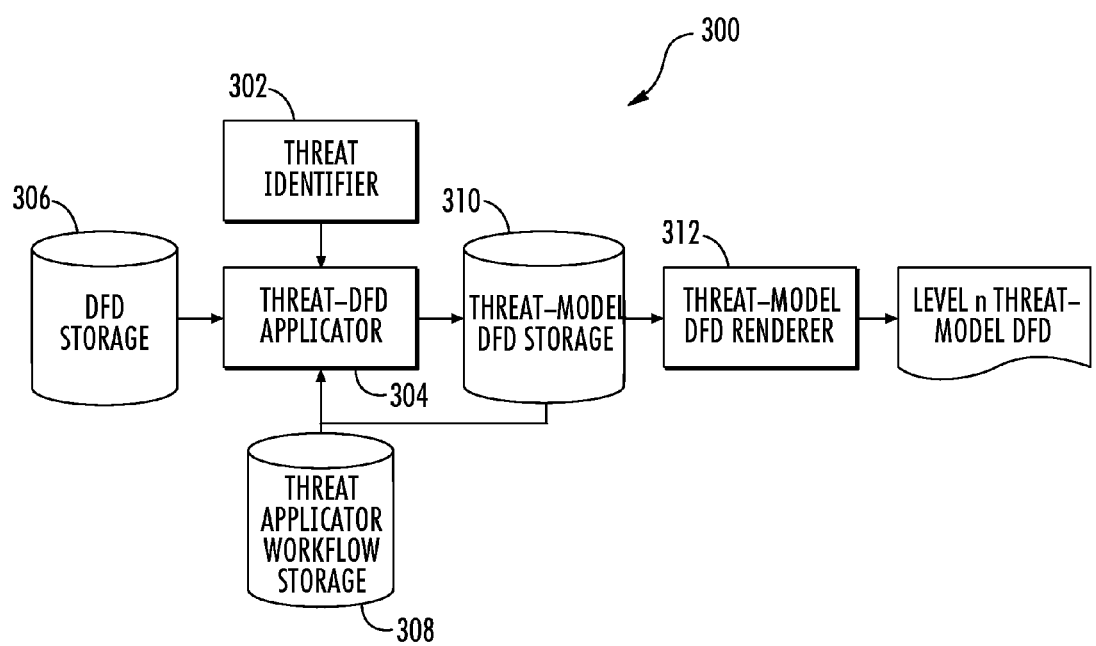

FIG. 3 illustrates a threat indicator 300, which in some example implementations of the present disclosure may correspond to the threat indicator 108 of FIG. 1. As indicated above and explained in greater detail below, the threat indicator may be more generally configured to identify a (one or more) cybersecurity threat to a particular element (component or data flow) of the information system, and add a secondary node representing the cybersecurity threat to the DFD to thereby produce a threat-model DFD for the information system. As shown, the threat indicator may include a threat identifier 302 coupled to and in communication with a threat-DFD applicator 304 configured to identify cybersecurity threats to respective particular components and/or data flows of the information system, as well as their attributes.

The threat-DFD applicator 304 configured to receive the identification of or identify cybersecurity threats (and their attributes) to components and data flows of the information system. The threat-DFD applicator may also be configured to receive a level n DFD for an information system—or in some examples the metadata attributes of the information system for a level n DFD, such as from a DFD storage 306 (e.g., file storage, database storage, cloud storage). The DFD storage may be resident with the threat indicator 300, or may be separate from and in communication with the threat indicator, and in some examples may correspond to DFD storage 218. And again, the DFD and its metadata may be formatted and stored in any of a number of different manners, and hence, their storage may be of any of a number of different types.

In some examples, the cybersecurity threats to components and data flows of the information system may be identified through the collection of information from the operator. This information may be collected or retrieved by the threat-DFD applicator 304, and with logic provided by the threat identifier 302, the cybersecurity threats may be identified.

In examples involving the collection of information, the threat-DFD applicator 304 may be coupled to a threat applicator workflow storage 308 (e.g., file storage, database storage, cloud storage) resident with or separate from but in communication with the threat indicator 300. Similar to the DFD modeling workflow storage, the threat applicator workflow storage may be configured to store a series of questions and instructions regarding their manner of presentation, which may be loaded by the threat-DFD applicator and presented to the operator. The threat-DFD applicator may then solicit information from the operator through these questions and their answers regarding possible cybersecurity threats to the information system, its components and data flows.

The threat-DFD applicator 304 may be configured to apply secondary nodes representing the cybersecurity threats to the DFD, and include metadata with structured information including attributes of the cybersecurity threats. The threat-DFD applicator may thereby produce a level n threat-model DFD for the information system. The threat-DFD applicator may be configured to communicate the threat-model DFD (including the metadata attributes for elements of the information system and cybersecurity threats thereto), such as to a threat-model DFD storage 310 (e.g., file storage, database storage, cloud storage) for later retrieval. Similar to the DFD storage 306, the threat-model DFD storage may be resident with the threat indicator 300, or may be separate from and in communication with the threat indicator. Also, similar to the DFD, the threat-model DFD and its metadata may be formatted and stored in any of a number of different manners, and hence, their storage may be of any of a number of different types. And in some examples, a previously-stored threat-model DFD may be retrieved from the threat-model DFD storage by the threat-DFD applicator to produce a new threat-model DFD.

In some examples, the threat-DFD applicator 304 may compose the metadata attributes of cybersecurity threats to the components and data flows of the information system without itself composing the threat-model DFD. In these examples, the threat-DFD applicator may communicate to the threat-model DFD storage, the metadata attributes of the information system and cybersecurity threats for a level n threat-model DFD. In these examples, the stored metadata attributes may be accessed by a separate threat-model renderer 312 configured to compose the level n threat-model DFD from the metadata attributes.

In accordance with example implementations, cybersecurity threats may be identified in any of a number of different manners. As explained above, a cybersecurity threat may refer to a circumstance or event with a likelihood to have an adverse impact on an asset such as the information system or complex-system platform used to implement the information system, such as through unauthorized access, destruction, disclosure, modification of data and/or denial of service. In some examples, cybersecurity threats may be identified through an analysis in which a number of security principles may be applied to the information system and its components (e.g., hosts, processes, data stores, external entities) and data flows, and perhaps also including components of the underlying complex-system platform. Examples of these security principles include confidentiality, integrity and availability, as described above. Other examples of suitable security principles include authentication (those accessing the information system or element are who they claim), authorization (those accessing the data are authorized to do so), auditing (actions on the information system/element—including alterations—are traceable), and the like.

The analysis that may be performed to identify cybersecurity threats may include an analysis of the technologies of the information system and/or complex-system platform, an analysis of the information system or complex-system platform and how it/they are used, an analysis of known abuse cases of the information system or complex-system platform, and the like. In some more particular examples, the analysis for identifying cybersecurity threats may include application of the STRIDE threat model developed by Microsoft. Another example of a suitable analysis may include application of the DREAD model, also developed by Microsoft.

The STRIDE threat model is an approach to identifying security design issues and cybersecurity threats, and its name is an acronym for six categories of threats that it covers: Spoofing, Tampering, Repudiation, Information disclosure, Denial of service and Elevation of privilege. These categories of threats are related to respective ones of the security principles described above. And for each of the threat categories, the STRIDE threat model includes a description of the cybersecurity threat for the category, and a number of security controls/mitigations that may be implemented to address the threat. This analysis or others may be performed to identify threats and various attributes of those threats, and as described below, may also be performed to identify one or more suggested mitigations to reduce a measure of the current risk presented by a threat.

Similar to identification of a cybersecurity threat, the threat-DFD applicator 304 in communication with the threat identifier 302 may be configured to identify any of a number of attributes of the cybersecurity threat. Examples of suitable attributes of a cybersecurity threat include one or more of the following:

| Cybersecurity Threat Attributes | |
|---|---|
| Attribute | Description |
| Threat | A description of the cybersecurity threat. |
| Applies To | Indicates component or data flow of the information system (DFD node or edge) to which the cybersecurity threat applies. |
| Vulnerability | Indicates the weakness in the information system or its component or data flow that gives rise to the cybersecurity threat. |
| Current Controls | Security controls, or factors, that are already implemented in the information system, or its component or data flow. Examples of suitable controls include technical controls (e.g., "encrypted connection"), administrative controls (e.g., "requires manager approval"), operational controls (e.g., "server is in an access-controlled data center") or the like. |

Figure 4:
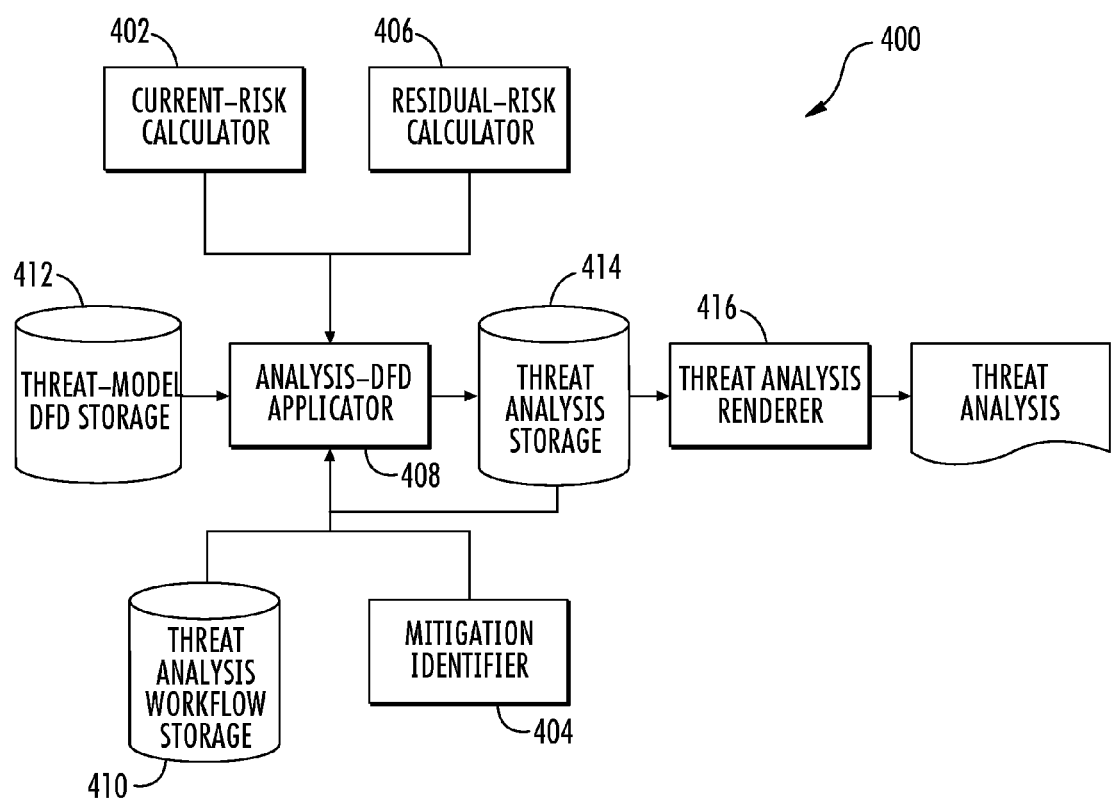

FIG. 4 illustrates a threat analyzer 400, which in some example implementations of the present disclosure may correspond to the threat analyzer 112 of FIG. 1. As indicated above and explained in greater detail below, the threat analyzer may be more generally configured to perform an analysis of the cybersecurity threat based on the threat-model DFD and metadata, and provide in the metadata associated with the secondary node for the cybersecurity threat, further structured information with further attributes of the cybersecurity threat. As shown in FIG. 4, the threat analyzer may include a current-risk calculator 402, mitigation identifier 404 and residual-risk calculator 406, which may be coupled to an analysis-DFD applicator 408.

The current-risk calculator 402 may be configured to identify or more particularly in some examples calculate a current-risk rating of the cybersecurity threat to a particular element of the information system. In some examples, the current-risk rating may be on a scale of increasing risk: low, medium, high or critical. In some more particular examples, the current-risk rating may be a function of likelihood and impact ratings. In some of these examples, likelihood may be on a scale of increasing likelihood: low, medium, high or very high; and likewise, impact may be on a scale of increasing impact: low, medium, high or critical. The current-risk calculator 402 may therefore be configured to calculate the current-risk rating from likelihood and impact ratings. One example according to which the current-risk rating may be calculated according to likelihood and impact ratings is shown in the following table:

| | Level of Impact | | | |
|---|---|---|---|---|
| Likelihood | Critical | High | Medium | Low |
| Very High | Critical | High | Medium | Low |
| High | Critical | High | Medium | Low |
| Medium | High | Medium | Medium | Low |
| Low | Medium | Low | Low | Low |
| | | Risk Rating | | |

In other examples, the current-risk calculator 402 may calculate the current-risk rating in a number of other manners. One example of a manner by which the current-risk rating may be calculated is according to the common vulnerability scoring system (CVSS) or some version thereof (e.g., CVSSv2).

The mitigation identifier 404 may be configured to identify a (one or more) suggested mitigation implementable to reduce the current-risk rating to a lower, residual-risk rating. This suggested mitigation may be identified in any of a number of manners. In one example, the suggested mitigation may be identified from or using an analysis similar to that for which the cybersecurity threat is identified. This may be the case, for example, in the case of application of the STRIDE threat model, which may provide a number of security controls or mitigations for a number of known security threats.

In some examples, the suggested mitigations of cybersecurity threats to components and data flows of the information system may be identified through the collection of information from the operator. This information may be collected or retrieved by the analysis-DFD applicator 408, and with logic provided by the mitigation identifier 404, suggested mitigations of cybersecurity threats may be identified.

In examples involving the collection of information, the analysis-DFD applicator 408 may be coupled to a threat analysis workflow storage 410 (e.g., file storage, database storage, cloud storage) resident with or separate from but in communication with the threat analyzer 400. Similar to the aforementioned workflow storage, the threat analysis workflow storage may be configured to store a series of questions and instructions regarding their manner of presentation, which may be loaded by the analysis-DFD applicator and presented to the operator. The analysis-DFD applicator may then solicit information from the operator through these questions and their answers regarding possible mitigations of cybersecurity threats to the information system, its components and data flows.

The residual-risk calculator 406, then, may be configured to identify or more particularly in some examples calculate the residual-risk rating of the cybersecurity threat after application of the suggested mitigation. Similar to the current-risk rating, in some examples, the residual-risk rating may be on a scale of increasing risk: low, medium, high or critical. The residual-risk rating may be identified or calculated in any of a number of different manners, some of which may be the same or similar to the manners in which the current-risk rating may be identified or calculated by the current-risk calculator 402.

The analysis-DFD applicator 408 may be configured to receive the current-risk rating, suggested mitigation and residual-risk rating from the current-risk calculator 402, mitigation identifier 404 and residual-risk calculator 406, the threat analyzer 400, or communicate with those components to calculate or identify the current-risk rating, suggested mitigation and residual-risk rating. The threat-DFD applicator may also be configured to receive a level n threat-model DFD for the information system—or in some examples the metadata attributes of the information system and cybersecurity threats for a level n threat-model DFD, such as from a threat-model DFD storage 412 (e.g., file storage, database storage, cloud storage). The threat-model DFD storage may be resident with the threat analyzer, or may be separate from and in communication with the threat analyzer, and in some examples may correspond to threat-model DFD storage 310)—the threat-model DFD and its metadata again being formatted and stored in any of a number of different manners.

The threat-model DFD may include a DFD of an information system and include a (one or more) secondary node representing a cybersecurity threat to an element of the information system. The threat-model DFD may likewise include metadata associated with the secondary node that includes structured information with attributes of the cybersecurity threat. The analysis-DFD applicator 408, then, may be configured to provide in the metadata associated with the secondary node for the cybersecurity threat, further structured information with further attributes of the cybersecurity threat.

The further attributes of a cybersecurity threat may come from the current-risk calculator 402, mitigation identifier 404 and residual-risk calculator 406, and may therefore include the current-risk rating, suggested mitigation and residual-risk rating. The further attributes may also include the likelihood and impact ratings on which the current-risk rating may be based. In some examples, then, the further attributes of a cybersecurity threat may include one or more of the following:

Further Cybersecurity Threat Attributes

| Attribute | Description |
| --- | --- |
| Impact | Measure of the adverse impact that could be caused by the cybersecurity threat (independent of any current or suggested security controls or mitigations). |
| Likelihood | Probability or likelihood that a threat source will exploit the vulnerability, given the current security controls already implemented. |
| Current Risk | Measure of current risk of the cybersecurity threat (e.g., current-risk rating), given currently implemented security controls in the system. This may be a function of impact and likelihood. |
| Suggested Mitigations | Suggested mitigations that may lower the measure of current risk to a lower, measure of residual risk. |
| Residual Risk | Measure of residual risk of the cybersecurity threat (e.g., residual-risk rating), given currently implemented security controls and after implementation of suggested mitigations in the system. In some examples, the measure of residual risk may be on a scale of increasing risk: low, medium, high or critical, with a typical goal being a residual risk of "low." |

By the above, the analysis-DFD applicator 408 may produce a threat analysis that includes at least the level n threat-model DFD (together with or simply including metadata for the information system's elements and cybersecurity threats), with metadata including further attributes of the cybersecurity threat. The analysis-DFD applicator may be configured to communicate the threat analysis, such as to a threat analysis storage 414 (e.g., file storage, database storage, cloud storage) for later retrieval. The threat analysis storage may be resident with the threat analyzer 400, or may be separate from and in communication with the threat analyzer. In some examples, a previously-stored threat analysis may be retrieved from the threat analysis storage by the threat analyzer to produce a new threat analysis.

In some examples, the analysis-DFD applicator 408 may compose the metadata attributes and further attributes of cybersecurity threats to the components and data flows of the information system without itself threat analysis. In these examples, the analysis-DFD applicator may communicate to the threat analysis storage 414, the metadata attributes and further attributes of the information system and cybersecurity threats. In these examples, the stored metadata attributes and further attributes may be accessed by a separate threat-analysis renderer 416 configured to produce the threat analysis from the metadata attributes and further attributes.

Figure 5:
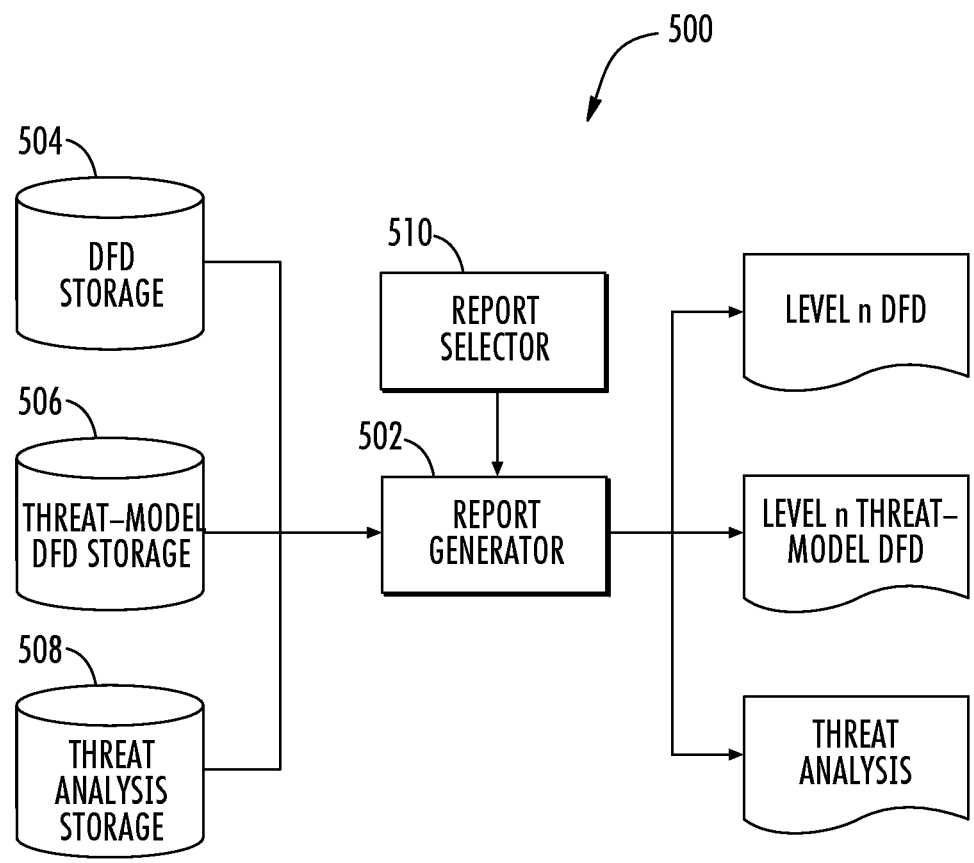

FIG. 5 illustrates a reporter 500, which in some example implementations of the present disclosure may correspond to the reporter 114 of FIG. 1. As indicated above and explained in greater detail below, the reporter may be configured to generate a report from the threat analysis, and including an organized arrangement of at least some of the attributes of at least some of the components, data flows or cybersecurity threat.

As shown, the reporter 500 may include a report generator 502 coupled to one or more storage such as a DFD storage 504, threat-model DFD storage 506 and/or threat analysis storage 508. This storage may be resident with the reporter, or may be separate from and in communication with the reporter, or some storage may be resident while other storage may be separate. In some examples, the DFD storage 504, threat-model DFD storage 506 and threat analysis storage 508 may correspond to DFD storage 218, 306 threat-model DFD storage 310, 412 and threat analysis storage 414, respectively.

The report generator 502 may be configured to retrieve any of a number of different pieces of information or data regarding an information system, its components and data flows, and/or cybersecurity threats, from one or more of the storage 504, 506, 508. For example, the report generator may retrieve from the DFD storage, a level n DFD for an information system (or simply the metadata attributes of the information system). Additionally or alternatively, the report generator may retrieve from the threat-model DFD storage, a level n threat-model DFD for the information system (or simply the metadata attributes of the information system and cybersecurity threats). And further additionally or alternatively, the report generator may retrieve a threat analysis for the information system (or simply the metadata attributes and further attributes of the information system and cybersecurity threats).

The report generator 502 may be configured to generate one or more reports based on the information retrieved from storage 504, 506, 508. In some examples, the report generator may be coupled to a report selector 510 configured to select or receive selection of one or more reports to be generated by the report generator. These reports may include a graphical arrangement, textual arrangement or some combination of graphical and textual arrangement of the components, data flows and/or cybersecurity threat for an information system. Graphically, the report generator may generate drawings of one or more of a level n DFD, level n threat-model DFD and/or threat analysis. Through the report selector, the operator may in some examples select the level (select n) of the DFD or threat-model DFD, a number of dependencies between information systems or components of information systems for which to generate reports (e.g., system A depends on system B, which depends on system C).

In some examples, the report generator 502 may be configured to generate one or more reports from the threat analysis, at least one of which may include an organized arrangement of at least some of the attributes of at least some of the components, data flows or cybersecurity threat. In some examples, the attributes may be organized in a table including a row for each of one or more cybersecurity threats, and a column for each of one or more attributes of the threat and/or element(s) of the information system to which the threat is applicable. In some examples, the report may include for each of one or more cybersecurity threats, a description of the cybersecurity threat and a vulnerability giving rise thereto, impact rating (e.g., independent of current security controls or suggested mitigation), any current security controls, likelihood rating, current-risk rating, suggested mitigation, residual-risk rating, element(s) of the information system to which the cybersecurity threat is applicable, and the like.

Reference is now made to FIG. 6, which illustrates a flowchart including various operations in a method 600 of modeling and analysis of cybersecurity threats in a complex-system platform, according to example implementations of the present disclosure. As shown at block 602, the method of these examples includes identifying elements of an information system configured for implementation by a complex-system platform, where the elements include components and data flows therebetween, and the components include one or more of a host, process, data store or external entity. The method also includes composing a DFD for the information system including metadata associated with nodes and edges of the DFD, as shown in block 604. In this regard, the nodes represent the components and edges represent the data flows. And the metadata (according to some metadata schema) provides structured information including attributes of the components and data flows.

As shown at block 606, the method also includes identifying a cybersecurity threat to a particular element of the elements of the information system. The method includes adding to the DFD, a secondary node representing the cybersecurity threat, and metadata associated with the secondary node and providing structured information including attributes of the cybersecurity threat, as shown in block 608. This may thereby produce a threat-model DFD for the information system. And the method may include performing an analysis of the cybersecurity threat based on the threat-model DFD and metadata associated with the nodes, edges and secondary node thereof, as shown at block 610.

To further illustrate example embodiments of the present invention, reference will now be made to FIGS. 7-9, which depict example graphical user interface (GUI) 700 in which a DFD, threat-model DFD and their metadata may be composed or produced according to some example implementations of the present disclosure. And FIGS. 10A and 10B depict an example report 1000 that may be generated according to example implementations. In some examples, the GUI may be provided by a commercially-available diagramming tool such as Microsoft Visio®, specifically configured to carry out various operations of example implementations; and in some examples, the report may be output to and displayed by a commercially-available spreadsheet tool such as Microsoft Excel®.

As shown in FIG. 7, in some examples, the GUI 700 may include a workspace 702 for composition of a level n DFD from shapes representing its nodes and edges. In some examples, as shown, the GUI may provide a stencil 704 with a collection of shapes for respective types of components (e.g., host, process, data store, external entity) and data flows of an information system, cybersecurity threats, and perhaps also various relevant components of the complex-system platform configured to implement the information system. And in some examples, these shapes may be configured to accept shape data, which may be specifically configured for types of attributes of the information systems' components (e.g., host, process, data store, external entity) and data flows, as well as the cybersecurity threats.

FIG. 8 illustrates the GUI 700 including various shapes placed in the workspace 702 and arranged to compose a level n DFD 802 for an information system. As shown, the DFD includes shapes for elements including various hosts 804, processes 806, data stores 808 and external entities 810, and data flows 812. As or after these elements (or rather their shapes) are placed in the workspace, attributes of the elements may be entered for their shapes. In some examples, a window 814 may be recalled for each of the shapes. And in this window, data for a shape and thus attributes of an element may be entered, and thereby included as structured information in metadata associated with the shape (and thus node or edge of the DFD). FIG. 8 illustrates an example in which the window presents fields for receiving or otherwise presenting attributes of the external entity "End User." The shapes may include a graphic and, in some examples, accompanying text that may be taken from the shape data (e.g., the name of the information system component or type of data flowing in the data flow).

FIG. 9 illustrates the GUI including a level n threat-model DFD 902 produced from the level n DFD 902 and further including a number of shapes for cybersecurity threats 904 to various elements of the information system modeled by the DFD. Similar to elements of the information system, as or after the cybersecurity threats (or rather their shapes) are placed in the workspace 702, attributes and even further attributes of the cybersecurity threats may be entered for their shapes. Also similar to before, in some examples, the window 814 may be recalled for each of the shapes, in which data for a shape and thus attributes of a cybersecurity threat may be entered, and thereby included as structured information in metadata associated with the shape (and thus secondary node). FIG. 9 illustrates an example in which the window presents fields for receiving or otherwise presenting attributes of the cybersecurity threat "Buffer overflow." Again, the shapes for the cybersecurity threats may include a graphic and, in some examples, the graphic may be color coded to various shape data such as the current-risk rating.

FIGS. 10A and 10B depict an example report 1000 that may be generated according to example implementations. As shown, for example, the report may include attributes (including further attributes) of at least some of the components, data flows or cybersecurity threat, organized in a table including rows 1002 for respective cybersecurity threats, and columns 1004 for respective attributes of the threat and/or element(s) of the information system to which the threat is applicable. In some examples, the report may include for each of one or more cybersecurity threats, a description of the cybersecurity threat and a vulnerability giving rise thereto, impact rating (e.g., independent of current security controls or suggested mitigation), any current security controls, likelihood rating, current-risk rating, suggested mitigation, residual-risk rating, element(s) of the information system to which the cybersecurity threat is applicable, and the like.

According to example implementations of the present disclosure, the system 100 for modeling and analysis of cybersecurity threats and its subsystems including the criticality establishment system 102, DFD level establishment system 104, DFD creator 106, threat indicator 108, decomposer 110, threat analyzer 112 and reporter 114 may be implemented by various means. Similarly, the examples of a DFD creator 200, threat indicator 300, threat analyzer 400 and reporter 500, including each of their respective elements, may be implemented by various means according to example implementations. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wired or wireless network or the like.

Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor (e.g., processor unit) connected to a memory (e.g., storage device).

The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory (of the same or another apparatus).

The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of computer hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links.

Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for implementation of a system for modeling and analysis of cybersecurity threats in a complex-system platform, the apparatus comprising a processor and a memory storing executable instructions that in response to execution by the processor cause the apparatus to implement at least:

a data flow diagram creator configured to identify elements of an information system configured for implementation by a complex-system platform, the elements including components and data flows therebetween, the components including one or more of a host, process, data store or external entity, the data flow diagram creator also being configured to compose a data flow diagram for the information system, the data flow diagram including nodes representing the components and edges representing the data flows, and in metadata associated with the nodes and edges, provide structured information including attributes of the components and data flows;

a threat indicator coupled to the data flow diagram creator and configured to identify a cybersecurity threat to a particular element of the elements of the information system, the threat indicator also being configured to add a secondary node representing the cybersecurity threat to the data flow diagram to thereby produce a threat-model data flow diagram for the information system, and in metadata associated with the secondary node, provide structured information including attributes of the cybersecurity threat; and a threat analyzer coupled to the threat indicator and configured to perform an analysis of the cybersecurity threat based on the threat-model data flow diagram and metadata associated with the nodes, edges and secondary node thereof.

2. The apparatus of claim 1, wherein the threat analyzer being configured to perform the analysis includes being configured to identify a measure of current risk of the cybersecurity threat to the particular element, identify a suggested mitigation implementable to reduce the measure of current risk to a lower, measure of residual risk, and provide in the metadata associated with the secondary node, further structured information including the measure of current risk, suggested mitigation and measure of residual risk.

3. The apparatus of claim 2, wherein the cybersecurity threat refers to a circumstance or event with a likelihood to have an adverse impact on the information system or particular element, and the measure of current risk is a function of measures of the likelihood and adverse impact, and wherein the further structured information provided in the metadata associated with the secondary node also includes the measures of likelihood and adverse impact.

4. The apparatus of claim 1, wherein the data flow diagram creator being configured to provide structured information including attributes of the components and data flows includes being configured to provide structured information including hardware, software and communications attributes of at least some of the components and data flows.

5. The apparatus of claim 1, wherein the data flow diagram creator being configured to provide structured information including attributes of the components and data flows includes being configured to provide structured information including any authentication, authorization or security controls to which the components and data flows are subject.

6. The apparatus of claim 1, wherein the threat indicator being configured to provide structured information including attributes of the cybersecurity threat includes being configured to provide structured information including a description of the cybersecurity threat and a vulnerability giving rise thereto, and a description of any current security controls designed to mitigate the cybersecurity threat.

7. The apparatus of claim 1, wherein the threat analyzer being configured to perform the analysis includes being configured to perform the analysis to thereby produce a threat analysis, and the memory stores further executable instructions that in response to execution by the processor cause the apparatus to further implement:
a reporter configured to generate a report from the threat analysis, and including an organized arrangement of at least some of the attributes of at least some of the components, data flows or cybersecurity threat.

8. A method of modeling and analysis of cybersecurity threats in a complex-system platform, the method comprising:
identifying elements of an information system configured for implementation by a complex-system platform, the elements including components and data flows therebetween, the components including one or more of a host, process, data store or external entity;
composing a data flow diagram for the information system, the data flow diagram including nodes representing the components and edges representing the data flows, and in metadata according to some metadata schema and associated with the nodes and edges, providing structured information including attributes of the components and data flows;
identifying a cybersecurity threat to a particular element of the elements of the information system;
adding a secondary node representing the cybersecurity threat to the data flow diagram to thereby produce a threat-model data flow diagram for the information system, and in metadata associated with the secondary node, providing structured information including attributes of the cybersecurity threat; and
performing an analysis of the cybersecurity threat based on the threat-model data flow diagram and metadata associated with the nodes, edges and secondary node thereof.

9. The method of claim 8, wherein performing the analysis includes:
identifying a measure of current risk of the cybersecurity threat to the particular element;
identifying a suggested mitigation implementable to reduce the measure of current risk to a lower, measure of residual risk; and
providing in the metadata associated with the secondary node, further structured information including the measure of current risk, suggested mitigation and measure of residual risk.

10. The method of claim 9, wherein the cybersecurity threat refers to a circumstance or event with a likelihood to have an adverse impact on the information system or particular element, and the measure of current risk is a function of measures of the likelihood and adverse impact, and
wherein the further structured information provided in the metadata associated with the secondary node also includes the measures of likelihood and adverse impact.

11. The method of claim 8, wherein providing structured information including attributes of the components and data flows includes providing structured information including hardware, software and communications attributes of at least some of the components and data flows.

12. The method of claim 8, wherein providing structured information including attributes of the components and data flows includes providing structured information including any authentication, authorization or security controls to which the components and data flows are subject.

13. The method of claim 8, wherein providing structured information including attributes of the cybersecurity threat includes providing structured information including a description of the cybersecurity threat and a vulnerability giving rise thereto, and a description of any current security controls designed to mitigate the cybersecurity threat.

14. The method of claim 8, wherein performing the analysis includes performing the analysis to thereby produce a threat analysis, and the method further comprises:
generating a report from the threat analysis, and including an organized arrangement of at least some of the attributes of at least some of the components, data flows or cybersecurity threat.

15. A computer-readable storage medium for modeling and analysis of cybersecurity threats in a complex-system platform, the computer-readable storage medium being non-transitory and having computer-readable program code portions stored therein that in response to execution by a processor, cause an apparatus to at least:
identify elements of an information system configured for implementation by a complex-system platform, the elements including components and data flows therebetween, the components including one or more of a host, process, data store or external entity;
compose a data flow diagram for the information system, the data flow diagram including nodes representing the components and edges representing the data flows, and in metadata associated with the nodes and edges, provide structured information including attributes of the components and data flows;
identify a cybersecurity threat to a particular element of the elements of the information system;
add a secondary node representing the cybersecurity threat to the data flow diagram to thereby produce a threat-model data flow diagram for the information system, and in metadata associated with the secondary node, provide structured information including attributes of the cybersecurity threat; and perform an analysis of the cybersecurity threat based on the threat-model data flow diagram and metadata associated with the nodes, edges and secondary node thereof.

16. The computer-readable storage medium of claim 15, wherein the apparatus being caused to perform the analysis includes being caused to identify a measure of current risk of the cybersecurity threat to the particular element, identify a suggested mitigation implementable to reduce the measure of current risk to a lower, measure of residual risk, and provide in the metadata associated with the secondary node, further structured information including the measure of current risk, suggested mitigation and measure of residual risk.

17. The computer-readable storage medium of claim 16, wherein the cybersecurity threat refers to a circumstance or event with a likelihood to have an adverse impact on the information system or particular element, and the measure of current risk is a function of measures of the likelihood and adverse impact, and wherein the further structured information provided in the metadata associated with the secondary node also includes the measures of likelihood and adverse impact.

18. The computer-readable storage medium of claim 15, wherein the apparatus being caused to provide structured information including attributes of the components and data flows includes being caused to provide structured information including hardware, software and communications attributes of at least some of the components and data flows.

19. The computer-readable storage medium of claim 15, wherein the apparatus being caused to provide structured information including attributes of the components and data flows includes being caused to provide structured information including any authentication, authorization or security controls to which the components and data flows are subject.

20. The computer-readable storage medium of claim 15, wherein the apparatus being caused to provide structured information including attributes of the cybersecurity threat includes being caused to provide structured information including a description of the cybersecurity threat and a vulnerability giving rise thereto, and a description of any current security controls designed to mitigate the cybersecurity threat.

21. The computer-readable storage medium of claim 15, wherein the apparatus being caused to perform the analysis includes being caused to perform the analysis to thereby produce a threat analysis, and the computer-readable storage medium has further computer-readable program code portions stored therein that, in response to execution by the processor, cause the apparatus to further:

generate a report from the threat analysis, and including an organized arrangement of at least some of the attributes of at least some of the components, data flows or cybersecurity threat.

* * * * *